US011838835B2

(12) United States Patent
Lee et al.

(10) Patent No.: US 11,838,835 B2
(45) Date of Patent: Dec. 5, 2023

(54) DISTRIBUTED INFERENCE SYSTEM AND OPERATING METHOD OF THE SAME

(71) Applicant: SAMSUNG ELECTRONICS CO., LTD., Suwon-si (KR)

(72) Inventors: Jangsu Lee, Seoul (KR); Byungdeok Kim, Yongin-si (KR); Youngmin Kim, Hwaseong-si (KR); Woosuk Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1102 days.

(21) Appl. No.: 16/530,549

(22) Filed: Aug. 2, 2019

(65) Prior Publication Data

US 2020/0219015 A1 Jul. 9, 2020

(30) Foreign Application Priority Data

Jan. 8, 2019 (KR) .................. 10-2019-0002344

(51) Int. Cl.
| | |
|---|---|
| *G06N 20/00* | (2019.01) |
| *H04W 4/38* | (2018.01) |
| *G06N 20/20* | (2019.01) |
| *H04L 67/00* | (2022.01) |
| *G06N 5/043* | (2023.01) |
| *G06F 18/214* | (2023.01) |
| *G06V 10/774* | (2022.01) |
| *G06V 10/94* | (2022.01) |

(52) U.S. Cl.
CPC ............ *H04W 4/38* (2018.02); *G06F 18/214* (2023.01); *G06N 5/043* (2013.01); *G06N 20/20* (2019.01); *G06V 10/774* (2022.01); *G06V 10/95* (2022.01); *H04L 67/34* (2013.01)

(58) Field of Classification Search
CPC .. G06N 5/00; G06N 5/02; G06N 5/04; G06N 20/00
USPC ...................................... 706/12, 45
See application file for complete search history.

(56) References Cited

U.S. PATENT DOCUMENTS

| | | | |
|---|---|---|---|
| 5,787,446 A * | 7/1998 | Dang | ...................... G06F 16/10 |
| 6,393,386 B1 | 5/2002 | Zager et al. | |
| 6,912,515 B2 | 6/2005 | Jackson et al. | |
| 7,519,676 B2 | 4/2009 | Horvitz et al. | |
| 7,617,042 B2 | 11/2009 | Horvitz et al. | |
| 8,270,411 B1 * | 9/2012 | Leung | ................... H04W 28/20 |
| | | | 370/468 |
| 10,944,683 B1 * | 3/2021 | Roskind | ................... H04L 47/58 |
| 10,990,850 B1 * | 4/2021 | Chen | .................... G06K 9/6262 |
| 2008/0154805 A1 * | 6/2008 | Gurumoorthy | ......... G06F 9/505 |
| | | | 717/174 |

(Continued)

FOREIGN PATENT DOCUMENTS

| | | |
|---|---|---|
| KR | 10-1446099 B1 | 10/2014 |
| KR | 10-1752488 B1 | 7/2017 |

*Primary Examiner* — Jue Louie
(74) *Attorney, Agent, or Firm* — Sughrue Mion, PLLC

(57) ABSTRACT

A distributed inference system includes an end device and a server. The end device generates status information and generates an inference result corresponding to target data based on a first machine learning model. The server creates a second machine learning model based on the status information and a training dataset including the inference result, calculates an accuracy of the inference result, and provides the second machine learning model to the end device based on the accuracy.

18 Claims, 14 Drawing Sheets

(56) References Cited

U.S. PATENT DOCUMENTS

| | | | |
|---|---|---|---|
| 2008/0256314 A1* | 10/2008 | Anand | G06F 11/1451 |
| | | | 711/162 |
| 2014/0237595 A1* | 8/2014 | Sridhara | G06F 21/566 |
| | | | 709/224 |
| 2015/0163324 A1* | 6/2015 | Bolotin | H04L 67/63 |
| | | | 709/225 |
| 2015/0324686 A1 | 11/2015 | Julian et al. | |
| 2016/0379134 A1 | 12/2016 | Kochut et al. | |
| 2017/0220949 A1 | 8/2017 | Feng et al. | |
| 2018/0005453 A1 | 1/2018 | Siddiqui et al. | |
| 2018/0165596 A1 | 6/2018 | Abrams et al. | |
| 2018/0220353 A1* | 8/2018 | Mendiola | H04W 24/02 |
| 2019/0036716 A1* | 1/2019 | Kasaragod | H04L 63/104 |
| 2019/0044831 A1* | 2/2019 | Guim Bernat | H04L 67/12 |
| 2019/0044882 A1* | 2/2019 | Poorchandran | H04L 47/52 |
| 2019/0156246 A1* | 5/2019 | Kuo | G06K 9/6256 |
| 2019/0370687 A1* | 12/2019 | Pezzillo | H04L 67/10 |
| 2020/0205147 A1* | 6/2020 | Li | H04W 72/30 |
| 2020/0287821 A1* | 9/2020 | Power | H04L 12/00 |

\* cited by examiner

DISTRIBUTED INFERENCE SYSTEM AND OPERATING METHOD OF THE SAME

CROSS-REFERENCE TO RELATED APPLICATIONS

This application is based on and claims priority from 35 U.S.C. § 119 to Korean Patent Application No. 10-2019-0002344 filed on Jan. 8, 2019, in the Korean Intellectual Property Office, the disclosures of which are incorporated by reference herein in their entireties.

BACKGROUND

Embodiments of the disclosure relate to an artificial intelligence system, and more particularly, relate to a distributed inference system and an operating method thereof.

Recently, artificial intelligence (AI) technology is being utilized in various fields. In particular, the AI technology may be applied to a network system, which processes information of various devices, such as an Internet of Things (IoT). For example, the IoT system may include various devices such as home appliances, a mobile device, and a computer device, may analyze data sensed or generated by each device, and may provide a service to a user based on a result of the analyzing.

The AI system may infer new information from the accumulated knowledge of the sensed or generated data. The devices may provide the service to the user by performing an action corresponding to a current purpose, based on a result of the inference. A distributed inference system that includes a plurality of clients and a server may perform a distributed inference corresponding to each of components. There is a demand on improving a performance of the distributed inference system.

SUMMARY

Embodiments of the disclosure provide a distributed inference system that improves the ability to infer, system stability and speed by creating a machine learning model in consideration of states of devices and an operating method thereof.

According to an aspect of the disclosure, there is provided a distributed inference system comprising: an end device configured to: generate status information corresponding to the end device, obtain target data, perform a first inference of the target data based on a first machine learning model and generate an inference result corresponding to the target data, and transmit the status information and the inference result; and a server configured to: receive the status information and the inference result, create a second machine learning model based on the status information and a training dataset comprising the inference result, generate accuracy information corresponding to an accuracy of the inference result, and transmit the second machine learning model to the end device based on the accuracy information.

According to another aspect of the disclosure, there is provided an operating method of a distributed inference system, the method comprising: providing status information corresponding to an end device to a server; obtaining target data; performing, at the end device, a first inference of target data based on a first machine learning model and generating an inference result corresponding to the target data; transmitting the status information and the inference result to the server; determining, at the server, whether to create a second machine learning model based on the inference result of the target data; creating, at the server, the second machine learning model based on the status information and a training dataset comprising the inference result; and transmitting the second machine learning model to the end device.

According to another aspect of the disclosure, there is provided operating method of a distributed inference system, the method comprising: providing status information corresponding to an end device to a server; generating, at the server, a priority corresponding to the end device based on the status information; performing, at the end device, a first inference of target data obtained by the end device; providing, by the end device, a first inference request to the server based on an inference result of the target data; and scheduling, at the server, the first inference request based on the priority corresponding to the end device.

According to another aspect of the disclosure, there is provided an end device comprising: a memory; and a processor configured to execute one or more instructions stored in the memory to: generate status information corresponding to the end device; obtain target data; perform a first inference of the target data based on a first machine learning model and generate an inference result corresponding to the target data, transmit the status information and the inference result; and receive a second machine learning model based on an accuracy information corresponding to an accuracy of the inference result.

According to another aspect of the disclosure, there is provided a server comprising: a memory; and a processor configured to execute one or more instructions stored in the memory to: receive status information corresponding to an end device, target data obtained by the end device and an inference result of the target data based on a first machine learning model in the end device; create a second machine learning model based on the status information and a training dataset comprising the inference result, generate accuracy information corresponding to an accuracy of the inference result, and transmit the second machine learning model to the end device based on the accuracy information.

BRIEF DESCRIPTION OF THE FIGURES

The above and other objects and features of the disclosure will become apparent by describing in detail exemplary embodiments thereof with reference to the accompanying drawings.

DETAILED DESCRIPTION

Below, embodiments of the disclosure will be described clearly and in detail with reference to accompanying drawings to such an extent that an ordinary one in the art implements embodiments of the invention.

Figure 1:
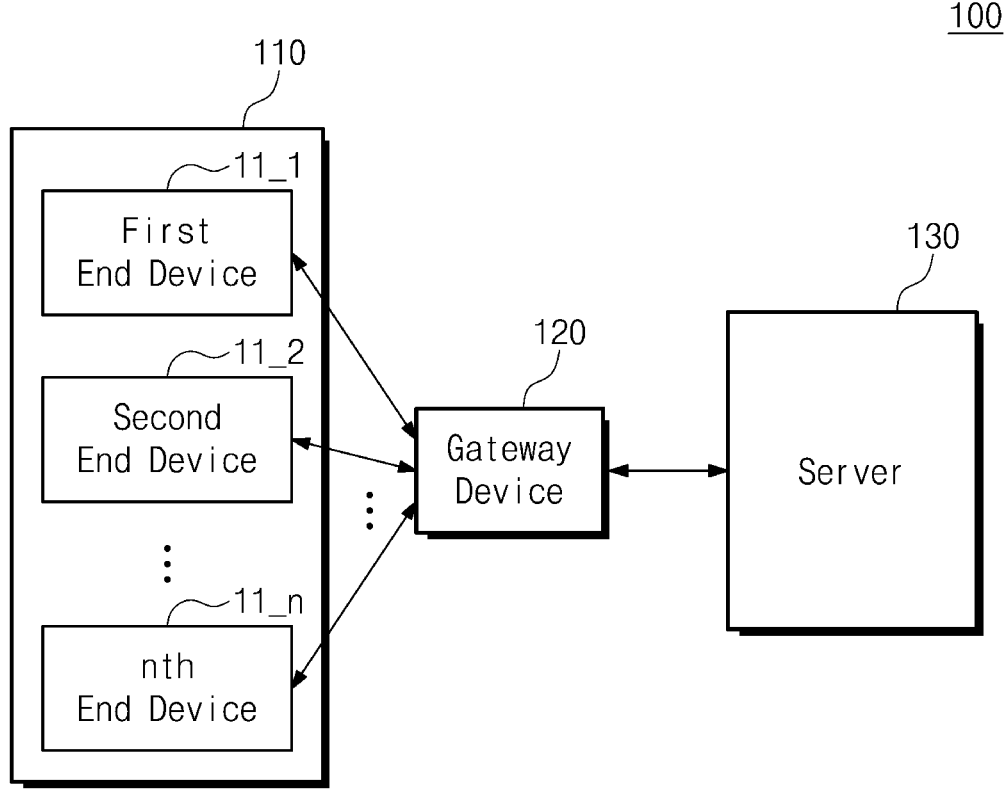
FIG. 1 is an exemplary block diagram of a distributed inference system according to an embodiment of the disclosure.

FIG. 1 is an exemplary block diagram of a distributed inference system according to an embodiment of the disclosure. A distributed inference system 100 may include various kinds of systems that process data through wired or wireless communication between devices. For example, the distributed inference system 100 may include an IoT (Internet of Things) system, a USN (Ubiquitous Sensor Network) system, an MTC (Machine Type Communications) system, an MOC (Machine Oriented Communication) system, an M2M (Machine to Machine) communication system, or a D2D (Device to Device) communication system. Referring to FIG. 1, the distributed inference system 100 may include a client 110, a gateway device 120, and a server 130.

The client 110 may include a plurality of end devices 11_1 to 11_n. For example, each of the plurality of end devices 11_1 to 11_n may be an IoT device. Each of the plurality of end devices 11_1 to 11_n may include a sensor, and may sense and collect data through the sensor. The collected data may be transmitted to the outside in a wired or wireless communication manner. Also, the plurality of end devices 11_1 to 11_n may receive information for an operation of an end device from the outside in the wired or wireless communication manner.

Each of the plurality of end devices 11_1 to 11_n may perform inference based on a machine learning model stored therein. For example, a first end device 11_1 may sense an image for recognizing a face through a camera and may infer whether the sensed face is associated with a registered person, by using the machine learning model. This machine learning model may be provided from the server 130. In the case where the inference fails, the first end device 11_1 may request the server 130 to infer and may receive an inference result or a new machine learning model from the server 130.

Each of the plurality of end devices 11_1 to 11_n may collect status information. The status information may include information about a kind or a purpose of an end device, information about an internal status of the end device such as a resource or a power, information about an ambient status of the end device such as a position or a temperature, or information about a kind of collected sensing data (target data). The status information may be an index indicating a characteristic and a current situation of each of the plurality of end devices 11_1 to 11_n. Each of the plurality of end devices 11_1 to 11_n may transmit the collected status information to the server 130.

The gateway device 120 may provide the sensing data or the status information received from each of the plurality of end devices 11_1 to 11_n to the server 130. The gateway device 120 may provide the plurality of end devices 11_1 to 11_n with an inference result, a machine learning model, or information for an operation of an end device, which is received from the server 130. The gateway device 120 may communicate with the server 130 through wired or wireless communication. According to another embodiment, the gateway device 120 may be included in one of the plurality of end devices 11_1 to 11_n.

The server 130 may analyze (or parse) the sensing data (target data) or the status information received from each of the plurality of end devices 11_1 to 11_n. Also, the server 130 may perform inference on target data in response to an inference request of each of the plurality of end devices 11_1 to 11_n. The server 130 may perform inference based on a machine learning model stored therein. The machine learning model may be created in advance based on status information so as to be optimized for a status of an end device. Because the machine learning model created in advance actively applies a status change of an end device, the machine learning model may be adaptive to the end device. The created machine learning model may be transmitted to the plurality of end devices 11_1 to 11_n.

The server 130 may set priorities of the plurality of end devices 11_1 to 11_n based on status information. The server 130 may analyze status information and may set a high priority to an end device that requires urgent processing of data. The server 130 may schedule an inference request based on a priority. Accordingly, data processing appropriate for requirements of each of the plurality of end devices 11_1 to 11_n may be possible, and a performance appropriate for requirements of the distributed inference system 100 may be secured. This will be more fully described.

Figure 2:
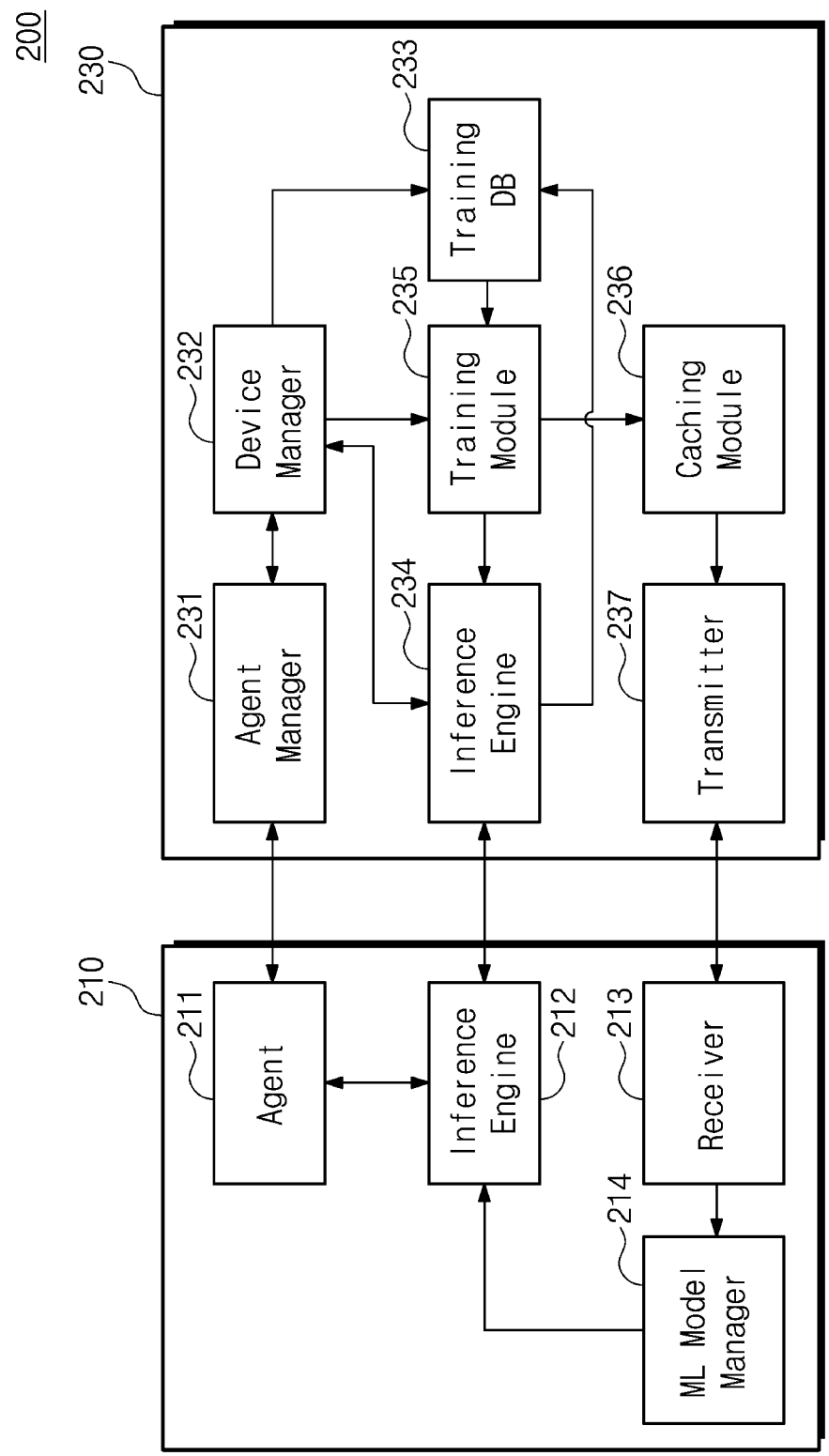
FIG. 2 is a block diagram illustrating an end device and a server of FIG. 1 in detail.

FIG. 2 is a block diagram illustrating an end device and a server of FIG. 1 in detail. Referring to FIG. 2, a distributed inference system 200 may include an end device 210 and a server 230. The end device 210 of FIG. 2 may be one of the plurality of end devices 11_1 to 11_n of FIG. 1. The server 230 of FIG. 2 may correspond to the server 130 of FIG. 1. Blocks illustrated in FIG. 2 may be implemented with hardware or may be implemented with firmware, software, or a combination thereof. For example, the software (or the firmware) may be loaded onto a memory (not illustrated) included in the end device 210 or the server 230 and may be executed by a processor (not illustrated).

The end device 210 may include an agent 211, an inference engine 212 (hereinafter referred to as a "first inference engine"), a receiver 213, and a machine learning model manager 214. A detailed implementation example of components included in the end device 210 will be described later with reference to FIG. 13.

The agent 211 may allow the end device 210 to perform a work corresponding to a purpose of the end device 210. For example, in the case where the end device 210 is included in a smart car, the agent 211 may control a drive in consideration of a position (or region), a speed, and an ambient situation of the smart car. To this end, the agent 211 may collect status information of the end device 210. The status information may be provided to the server 230.

The first inference engine 212 may perform inference on target data for the purpose of performing a work corresponding to the purpose of the end device 210. The first inference engine 212 may generate an inference result of the target data, based on the machine learning model stored in the end device 210. Here, the target data may be data that are input to the machine learning model for a next action of the end device 210. The target data may include sensing data that are sensed from a sensor (not illustrated) included in the end device 210. For example, the end device 210 may be included in a security system, and the machine learning model may be a model for recognizing faces of persons that are registered in advance. In this case, the target data may include image data that are generated from a camera of the end device 210. The agent 211 may control an operation of the camera, and the image data generated according to an operation of the camera may be input to the first inference engine 212.

The first inference engine 212 may transmit the inference request to the server 230, based on an inference result. In the case where the first inference engine 212 fails in the inference using the machine learning model, the inference request may be transmitted to the server 230 together with the inference result and the target data. In response to the inference request, the server 230 may perform inference on the target data or may transmit a new machine learning model to the end device 210. For example, in the above security system, when a recognized face is not associated with a registered person, the first inference engine 212 may determine that the inference fails, and thus, the inference request may be transmitted to the server 230.

In the case where the first inference engine 212 succeeds in the inference using the machine learning model, hit data may be transmitted to the server 230 together with the inference result and the target data so as to be utilized to renew the machine learning model later. The hit data may be information indicating the success in the inference. For example, in the above security system, when a recognized face is determined as being associated with one of registered persons, the first inference engine 212 may determine that the inference is successful. The first inference engine 212 may transmit the image data corresponding to the target data, the inference result corresponding to the recognized person, and the hit data to the server 230. The transmitted data may be utilized as training data for generating a machine learning model having an improved performance at the server 230.

In the case where the accuracy of inference of the machine learning model stored in the end device 210 does not satisfy a reference range (a reference accuracy), the receiver 213 may receive a new machine learning model from the server 230. The new machine learning model may be provided to the machine learning model manager 214. According to another embodiment, the receiver 213 may be integrated with the machine learning model manager 214.

The machine learning model manager 214 may renew the new machine learning model. The machine learning model manager 214 may erase a previous machine learning model stored in the end device 210 and may renew the new machine learning model. On the basis of a free space of a memory (not illustrated) for storing a machine learning model, the machine learning model manager 214 may determine a time at which the receiver 213 receives a new machine learning model. For example, in the case where a size of the machine learning model is smaller than the free space, the previous machine learning model may be erased after the new machine learning model is received. In contrast, in the case where the size of the machine learning model is greater than the free space, the new machine learning model may be received after the previous machine learning model is erased. In this case, for real-time inference, scheduled inference in the first inference engine 212 may be offloaded onto the server 230 from the first inference engine 212.

The server 230 may include an agent manager 231, a device manager 232, a training database 233, an inference engine 234 (hereinafter referred to as a "second inference engine"), a training module 235, a caching module 236, and a transmitter 237. A detailed implementation example of components included in the server 230 will be described later with reference to FIG. 14.

The agent manager 231 may receive status information from the agent 211 and may control and manage the agent 211 based on the status information. The agent manager 231 may determine whether the end device 210 is a registered device, based on the received status information. In the case where the end device 210 is not registered, the agent manager 231 may register the end device 210. Also, the agent manager 231 may generate manual information corresponding to a current status of the agent 211, based on the status information. The manual information may be information indicating an action guide of the end device 210. For instance, the manual information is information for guiding an action corresponding to the end device. For example, in the case where a battery capacity of the end device 210 is insufficient or a sleep mode is long, the agent manager 231 may provide the manual information to the agent 211 so as to adjust a period where the status information is collected and transmitted. According to an embodiment, the manual information to the agent 211 may be to increase a period where the status information is collected and transmitted.

The device manager 232 may manage the end device 210 and a status of the end device 210. The device manager 232 may receive the status information from the agent manager 231. The device manager 232 may decide a grade of the end device 210 based on the status information. Here, the grade may be an index for classifying a status of an end device that is required to the end device 210. For example, in the case where a result of analyzing the status information indicates that an inference request is very urgent (e.g., is directly related to the life of the user), the device manager 232 may grant the highest grade to the end device 210. For example, in the case where a result of analyzing the status information indicates that the frequency of use is low and it is possible to perform the inference during an idle time, the device manager 232 may grant the lowest grade to the end device 210.

A grade generated from the device manager 232 may be provided to the agent manager 231. The agent manager 231 may generate manual information, based on a grade of an end device. To this end, the agent manager 231 may in advance set an action guide corresponding to the grade. The agent 211 may change an operating mode of the end device 210, based on manual information.

The device manager 232 may set a priority of an end device, based on a grade of each of a plurality of end devices. In the case where the inference request is input to the server 230, based on the set priority, the inference request may be scheduled. Accordingly, data corresponding to an end device of an urgent state may be processed first of all. The device manager 232 may provide the set priority to the second inference engine 234, and the second inference engine 234 may decide an inference order of end devices based on the priority.

The device manager 232 may generate an index of a training dataset for creating a machine learning model corresponding to an end device, based on the status information. For example, the device manager 232 may recognize a kind of sensing data (target area) from the status information and may generate an index corresponding to the kind of the target data. The index may be provided to the training database 233.

The training database 233 may be implemented in the server 230 for the purpose of managing a training dataset. For example, the training database 233 may be implemented in a storage medium of the server 230 such as storage (not illustrated). The target data may be grouped to correspond to the index provided from the device manager 232, and the grouped target data may be stored in the training database 233.

The accuracy of the inference result may be applied to the training dataset. The accuracy of the inference result may be calculated based on an inference result or hit data of the first inference engine 212 or the second inference engine 234. For example, the training dataset may include an inference result, hit data, a hit rate based on the hit data, or the calculated accuracy. The accuracy of the inference result may be an index for determining the importance of the target data. As the accuracy is applied, whether any target data contribute to the improvement of the accuracy of the inference result may statistically appear. In the process of creating a machine learning model, based on the accuracy of the inference result, a part of the training dataset may be selected or weighted.

The second inference engine 234 may perform inference on the target data in response to the inference request of the end device 210. The second inference engine 234 may generate an inference result of the target data, based on the machine learning model created from the training module 235 and stored in the caching module 236. The target data may be provided from the first inference engine 212. The inference result and the hit data may be provided to the training database 233 for the purpose of training a machine learning model.

The second inference engine 234 may calculate the accuracy of the inference result of the first inference engine 212. For example, the accuracy may be calculated based on the hit rate of the inference result, that is, the frequency of success. For example, the accuracy may be calculated comparing the inference result and a known true value. The accuracy of the inference result may be provided to the training database 233 for the purpose of creating or training a new machine learning model.

Also, the accuracy of the inference result may be provided to the device manager 232 for the purpose of determining whether to create a machine learning model. The device manager 232 may determine whether to create a machine learning model, by determining whether the accuracy satisfies a reference range. The reference range may be a range of the reference accuracy required for a normal operation of the end device 210. For example, in the case where the accuracy does not satisfy the reference range, the device manager 232 may command the training module 235 to create a machine learning model.

In addition, the device manager 232 may set a grade or a priority of the end device 210, based on the accuracy of the inference result together with the status information. For example, the case whether the accuracy of the inference result of the first inference engine 212 does not markedly reach the reference range and thus it is difficult to expect a normal operation of the end device 210 may be determined as the urgency of data processing is required. In this case, the device manager 232 may set a grade or a priority of the end device 210 to be higher than the previously set grade or priority.

The training module 235 may create a new machine learning model, in response to a command of the device manager 232. The training module 235 may create a machine learning model, based on the status information and the training dataset. The training module 235 may receive the status information from the device manager 232 and may receive the training dataset from the training database 233. The training module 235 may create a machine learning model optimized to a current status of the end device 210, based on the status information. The training module 235 may learn or train the machine learning model based on the training dataset.

The caching module 236 may be implemented to maintain and manage the machine learning model created from the training module 235. For example, the caching module 236 may be implemented in the storage medium of the server 230 such as a cache memory (not illustrated). The caching module 236 may receive the new machine learning model from the training module 235. In the case where the new machine learning model is different from a model previously stored in the caching module 236, the previous model may be erased, and the new machine learning model may be stored in the caching module 236.

The transmitter 237 may receive the new machine learning model from the caching module 236. The transmitter 237 may transmit the new machine learning model to the receiver 213. Before transmitting the new machine learning model to the end device 210, the transmitter 237 may transmit size information of a machine learning model to the end device 210 such that the machine learning model manager 214 decides a time to receive the new machine learning model.

Figure 3:
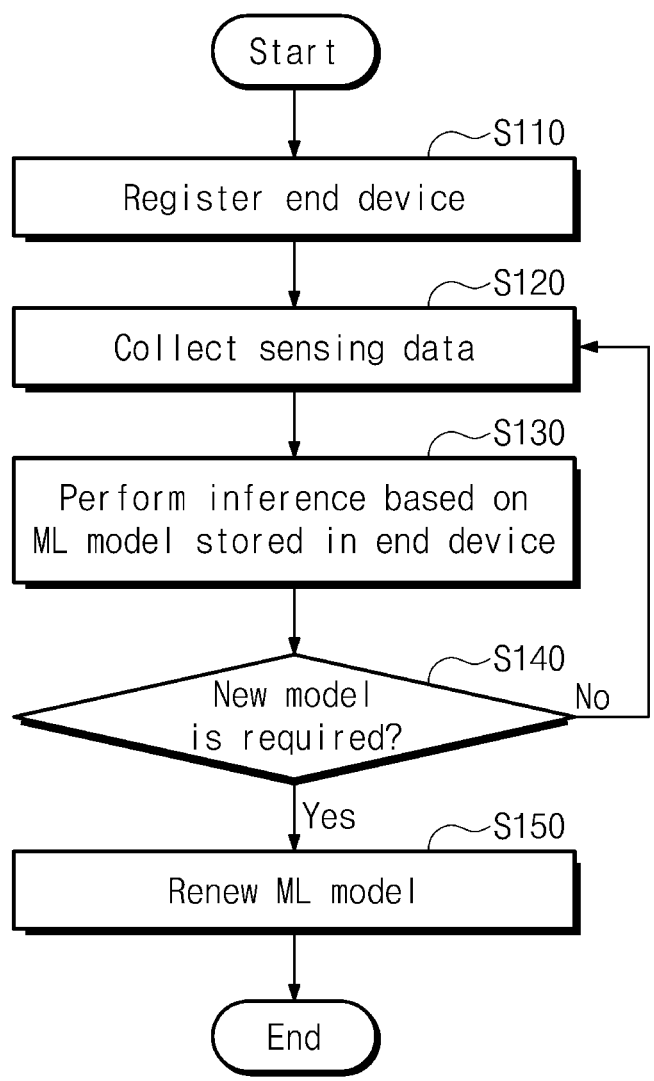
FIG. 3 is a flowchart for describing an operating method of a distributed inference system of FIG. 2.

FIG. 3 is a flowchart for describing an operating method of a distributed inference system of FIG. 2. FIG. 3 illustrates a method of renewing a machine learning model with a new machine learning model created by the server 230 at the end device 210. The method of FIG. 3 may be performed by using the distributed inference system 200 of FIG. 2. For convenience of description, FIG. 3 will be described with reference to reference numerals/marks of FIG. 2.

In operation S110, the server 230 may register the end device 210 based on status information. The server 230 may receive the status information from the end device 210 and may analyze information about a kind of an end device included in the status information. The server 230 may determine whether the end device 210 corresponding to the status information is registered. When a result of the determination indicates that the end device 210 is not registered, the server 230 may register the end device 210. The server 230 may calculate a grade and a priority of the end device 210 based on the status information.

In operation S120, the end device 210 may collect sensing data (or target data). The sensing data may be collected through a sensor included in the end device 210.

In operation S130, the server 210 may perform inference on the sensing data based on a machine learning model stored therein. When the inference is successfully performed on the sensing data, the first inference engine 212 may provide an inference result, the sensing data, and hit data to the second inference engine 234. When the inference on the sensing data fails, the first inference engine 212 may provide an inference result, the sensing data, and an inference request to the second inference engine 234.

In operation S140, the server 230 may determine whether a new machine learning model is required for the end device 210. The server 230 may calculate the accuracy of the inference result of the end device 210. When a result of the calculation indicates that the accuracy does not satisfy the reference range, the server 230 may determine that a new machine learning model is required for the end device 210. In this case, the method may proceed to operation S150. When a result of the calculation indicates that the accuracy satisfies the reference range, the method may proceed to operation S20, and the machine learning model stored in the end device 210 may be maintained.

In operation S150, the server 230 may renew the machine learning model with the new machine learning model in the end device 210. The new machine learning model may be trained and created based on the status information, and inference results and sensing data that are previously provided. The end device 210 may store the new machine learning model and may erase a previous machine learning model.

According to another embodiment, renewing the machine learning model with the new machine learning model may include updating the previous machine learning model with one or more components of the new machine learning model. According to another embodiment, renewing the machine learning model with the new machine learning model may include completely replacing the previously machine learning model with the new machine learning model.

Figure 4:
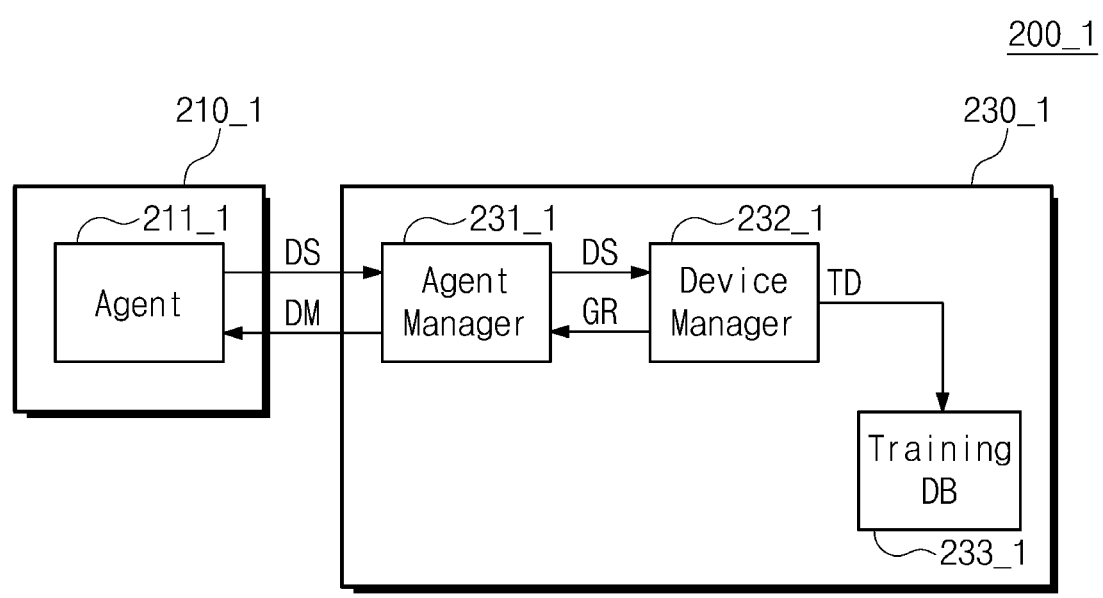
FIG. 4 is a block diagram of a distributed inference system associated with operation S110 of FIG. 3.

FIG. 4 is a block diagram of a distributed inference system associated with operation S110 of FIG. 3. Referring to FIG. 4, a distributed inference system 200_1 may include an end device 210_1 and a server 230_1. The end device 210_1 may include an agent 211_1. The server 230_1 includes an agent manager 231_1, a device manager 232_1, and a training database 233_1. FIG. 4 shows a data transfer relationship between some components of FIG. 2 performing operation S110.

The agent 211_1 may collect or generate status information DS of the end device 210_1 and may provide the status information DS to the agent manager 231_1. The agent manager 231_1 may determine whether the end device 210_1 is registered, based on the status information DS. The agent manager 231_1 may provide the status information DS to the device manager 232_1.

The device manager 232_1 may analyze the status information DS, may set a grade GR of the end device 210_1 based on a result of the analysis, and may set a priority of the end device 210_1 based on the grade GR. The priority of the end device 210_1 may be used to schedule inference requests of a plurality of end devices. The device manager 232_1 may provide the grade GR to the agent manager 231_1. The agent manager 231_1 may provide manual information DM, which is set according to the received grade GR, to the agent 211_1. The agent 211_1 may change an operating mode of the end device 210_1, based on the manual information DM.

The device manager 232_1 may generate and manage a training dataset TD for training and creating a new machine learning model. The device manager 232_1 may generate an index of the training dataset TD, based on the status information DS. The training dataset TD may be provided to the training database 233_1. Afterward, when a new machine learning model is created, the device manager 232_1 may provide the status information DS such that an adaptive machine learning model to which a current status of the end device 210_1 is applied is created.

Figure 5:
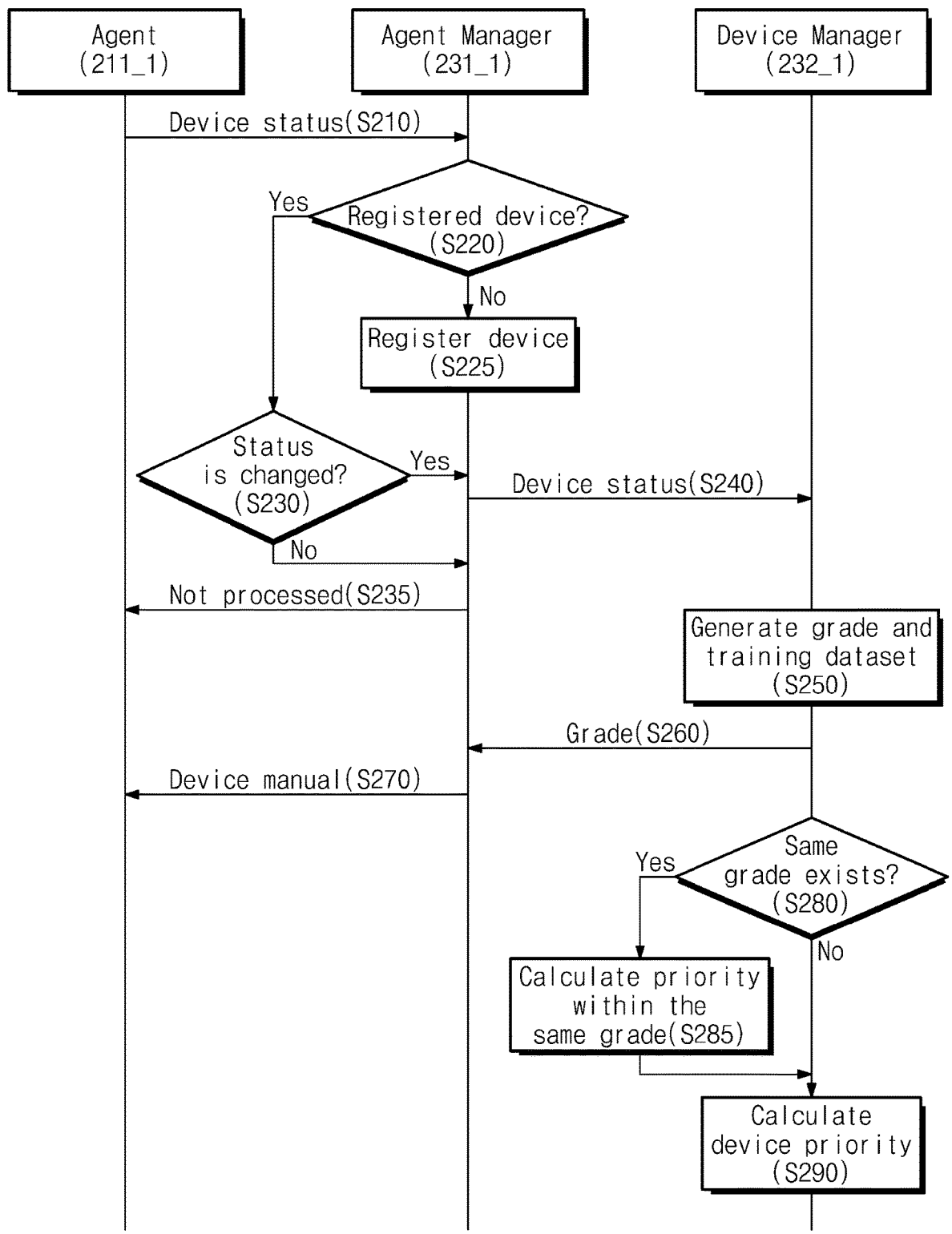
FIG. 5 is a flowchart for describing an operating method of a distributed inference system of FIG. 4.

FIG. 5 is a flowchart for describing an operating method of a distributed inference system of FIG. 4. FIG. 5 shows operations of the agent 211_1, the agent manager 231_1, and the device manager 232_1 of FIG. 4. For convenience of description, FIG. 5 will be described with reference to reference numerals/marks of FIG. 4.

In operation S210, the agent 211_1 may provide the status information DS to the agent manager 231_1. As described above, the status information DS may include information about a kind or a purpose of an end device, such as identification information. The status information DS may include information about an internal status of an end device, such as resource or power status information. The status information DS may include information about an ambient status of an end device, such as position information. The status information DS may include information about a kind of sensing data (or target data) such as an image or a voice.

In operation S220, the agent manager 231_1 may interpret and analyze the status information DS. The agent manager 231_1 may determine whether the end device 210_1 is registered, based on the status information DS. For example, the agent manager 231_1 may determine whether identification information of the end device 210_1 included in the status information DS is present in a device list table of the agent manager 231_1. When the identification information is absent, operation S225 is performed. In this case, the agent manager 231_1 may register the end device 210_1 at the device list table. When the identification information is present, the agent manager 231_1 determines that the end device 210_1 is already registered, and operation S230 is performed.

In operation S230, the agent manager 231_1 may whether the status information DS is changed. For example, the agent manager 231_1 may compare status information previously provided from the agent 211_1 with the current status information DS. When it is determined that the status information DS is not changed, operation S235 is performed. In this case, the agent manager 231_1 may determine that additional processing is not necessary since the end device 210_1 maintains a current status. Accordingly, the agent manager 231_1 may not perform a separate process or may provide a "not processed" message to the agent 211_1. The agent 211_1 may maintain the operating mode of the end device 210_1.

When the status information DS is changed or when the end device 210_1 is registered for the first time, operation S240 is performed. In this case, the agent manager 231_1 may provide the status information DS to the device manager 232_1 for the purpose of changing or controlling an operation of the end device 210_1.

In operation S250, the device manager 232_1 may generate the grade GR of the end device 210_1. To this end, the device manager 232_1 may interpret and analyze the status information DS. The device manager 232_1 may calculate the grade GR, based on the status information DS and a training dataset being managed. The training dataset being managed may include the accuracy of a previous inference result, and may be stored in the training database 233_1.

In an embodiment, the grade GR may be classified as a danger grade, a time critical grade, an accuracy guarantee grade, an efficiency grade, a normal grade, or an unimportant grade. The danger grade may be set in the case where a status or an inference request of the end device 210_1 is urgent to such an extent as to be directly related to the user's personal danger. The time critical grade may be set in the case where a fast inference request is required, for example, in the case where a deadline exists. The accuracy guarantee grade may be set in the case where the accuracy of inference is out of the reference range to such an extent that a normal operation is difficult. The efficiency grade may be set in the case where an efficiency increases as processing becomes faster, considering a storage space of the end device 210_1 or the like. The normal grade may be set in a normal case that does not correspond to the above cases. The unimportant grade may be set in the case where the frequency of use is low and the inference is possible during an idle time.

In operation S250, the device manager 232_1 may generate the training dataset TD corresponding to the end device 210_1. The device manager 232_1 may generate an index of the training dataset TD based on information about target data included in the status information DS. The device manager 232_1 may generate and change the training dataset TD by further receiving the target data, an inference result, and hit data. The device manager 232_1 may determine whether any target data contribute to improvement of the accuracy of the inference result and may apply a result of the determination to the training dataset TD and manage the training dataset TD. The training dataset TD may be stored in the training database 233_1. According to another embodiment, the training dataset TD may be generated at a different time after operation S240. For example, the training dataset TD may be generated after operation S290.

In operation S260, the device manager 232_1 may provide the calculated grade GR to the agent manager 231_1. The agent manager 231_1 may generate the manual information DM, based on the grade GR. The agent manager 231_1 may set an action guide corresponding to the grade GR in advance. For example, the agent manager 231_1 may receive the grade GR that is set in the case where a battery capacity of the end device 210_1 is insufficient. In this case, the agent manager 231_1 may generate the manual information DM so as to increase a period in which information of the end device 210_1 is collected or transmitted.

In operation S270, the agent manager 231_1 may provide the generated manual information DM to the agent 211_1. The agent 211_1 may change an operating mode of the end device 210_1, based on the manual information DM. An action guide of the end device 210_1 may be provided in real time depending on the status information DS, and thus, the stability of the end device 210_1 may be improved.

In operation S280, the device manager 232_1 may determine whether an end device of the same grade GR exists, for the purpose of calculating a priority of the end device 210_1. For example, the device manager 232_1 may search a status management table for an end device of the same grade. When an end device of the same grade exists, operation S285 is performed.

In operation S285, the device manager 232_1 may calculate priorities of end devices of the same grade. For example, the device manager 232_1 may again analyze the status information DS to calculate a priority. For example, the device manager 232_1 may calculate priorities of end devices of the same grade in further consideration of another index of status information or the accuracy of the inference result.

In operation S290, the device manager 232_1 may calculate priorities of end devices of another grade. For example, as described above, in the case where the grade GR is classified as a danger grade, a time critical grade, an accuracy guarantee grade, an efficiency grade, a normal grade, or an unimportant grade, a priority may be set in order. That is, the highest priority may be set to the danger grade, and the lowest priority may be set to the unimportant grade. The priority of the end device 210_1 may be used to schedule an inference request. Accordingly, data may be actively processed according to a status of the end device 210_1, and the stability of the end device 210_1 may be improved. According to another embodiment, the manner of calculating to the priorities of the end devices are not limited to operations S285 and S290. As such, the priorities of the end devices may be determined in a different manner or a different order than the illustration in FIG. 5.

Figure 6:
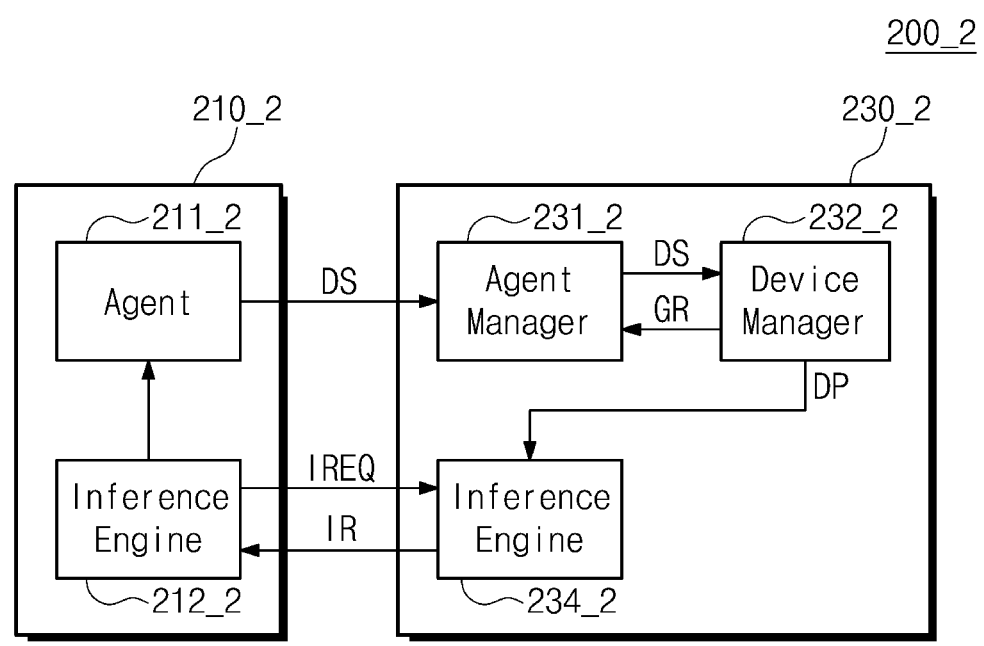
FIG. 6 is a block diagram of a distributed inference system associated with operation S130 of FIG. 3.

FIG. 6 is a block diagram of a distributed inference system associated with operation S130 of FIG. 3. Referring to FIG. 6, a distributed inference system 200_2 may include an end device 210_2 and a server 230_2. The end device 210_2 may include an agent 211_2 and a first inference engine 212_2. The server 230_2 includes an agent manager 231_2, a device manager 232_2, and a second inference engine 234_2. FIG. 6 shows a data transfer relationship between some components of FIG. 2 performing operation S130.

As described with reference to FIG. 4, the agent 211_2 may provide the status information DS to the agent manager 231_2, and the agent manager 231_2 may provide the status information DS to the device manager 232_2. The device manager 232_2 may set the grade GR of the end device 210_2 based on the status information DS and may provide the grade GR to the agent manager 231_2. The device manager 232_2 may calculate a priority DP of the end device 210_2 based on the grade GR. The device manager 232_2 may provide the priority DP to the second inference engine 234_2.

The first inference engine 212_2 may perform inference on target data, based on a machine learning model stored in the end device 210_2. When the inference is successfully performed, the first inference engine 212_2 may provide an inference result, target data, and hit data to the server 230_2. The inference result, the target data, and the hit data may be used to train and create a new machine learning model. Also, the first inference engine 212_2 may provide the inference result to the agent 211_2. The agent 211_2 may control the end device 210_2, based on the inference result.

In the case where the inference of the first inference engine 212_2 fails, the first inference engine 212_2 may provide an inference request IREQ to the second inference engine 234_2. The first inference engine 212_2 may provide the inference result and the target data to the second interference engine 234_2, together with the inference request IREQ. The second inference engine 234_2 may perform inference on the target data in response to the inference request IREQ. An inference result IR of the second inference engine 234_2 may be provided to the first inference engine 212_2 or may be provided to the agent 211_2.

The second inference engine 234_2 may schedule the inference request IREQ, based on the priority DP of the end device 210_2. In the case where inference requests are received from a plurality of end devices, the second inference engine 234_2 may sequentially perform inference, based on the priority DP. However, the disclosure is not limited thereto. For example, the second inference engine 234_2 may perform inference in the order that the second inference engine 234_2 receives the inference requests, and may change an inference order with reference to the priority DP only when a work of the end device 210_2 of the high priority DP is restricted.

Figure 7:
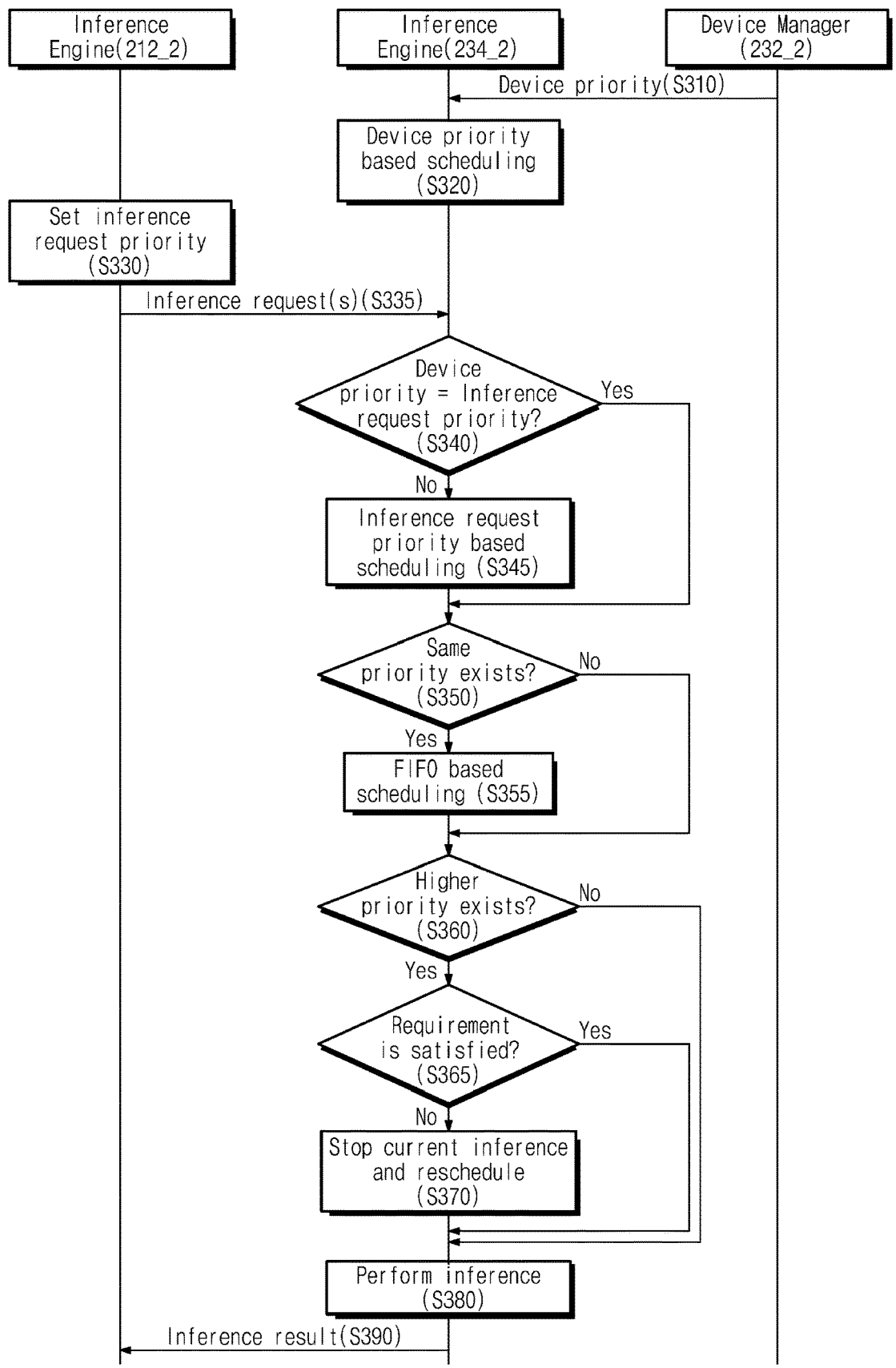
FIG. 7 is a flowchart for describing an operating method of a distributed inference system of FIG. 6.

FIG. 7 is a flowchart for describing an operating method of a distributed inference system of FIG. 6. FIG. 7 shows operations of the first inference engine 212_2, the second inference engine 234_2, and the device manager 232_2 of FIG. 6. For convenience of description, FIG. 7 will be described with reference to reference numerals/marks of FIG. 6.

In operation S310, the device manager 232_2 provides the priority DP (hereinafter referred to as a "device priority") of each end device to the second inference engine 234_2. The device priority DP may be generated based on status information of each end device. As described with reference to FIG. 5, the device manager 232_2 may generate grades based on status information of a plurality of end devices and may generate the device priority DP based on the grades.

In operation S320, the second inference engine 234_2 may perform scheduling based on the device priority DP. In principle, the second inference engine 234_2 may schedule the inference request IREQ present in a waiting queue, based on the device priority DP.

In operation S330, the first inference engine 212_2 may set a priority (hereinafter referred to as an "inference request priority") to the inference request IREQ. In operation S335, the first inference engine 212_2 may provide the inference request IREQ to the second inference engine 234_2. For example, the first inference engine 212_2 may provide the inference request priority to the second inference engine 234_2 together with the inference request IREQ.

In the case where operation S330 and operation S335 are performed, in operation S340, the second inference engine 234_2 may compare an inference request priority corresponding to the inference request IREQ with the device priority DP. When the inference request priority is the same as the device priority DP, the inference request IREQ may be processed based on a device priority-based scheduling. When the inference request priority is different from the device priority DP, operation S345 is performed. In this case, the second inference engine 234_2 may schedule the inference request IREQ, based on the inference request priority provided from the first inference engine 212_2.

In operation S350, the second inference engine 234_2 may determine whether inference requests of the same priority exist. Here, the priority may be the device priority DP or the inference request priority. When the inference requests of the same priority exist, operation S355 is performed to decide a priority between the inference requests. In operation S355, the second inference engine 234_2 may process the inference request IREQ based on first-in first-out (FIFO). When inference requests of the same priority do not exist, operation S360 is performed.

In operation S360, the second inference engine 234_2 may determine whether an inference request having a higher priority than the inference request IREQ being currently processed exists. For example, while the inference is performed on target data of a first end device based on the scheduled inference request IREQ, an inference request of a second end device may be provided to the second inference engine 234_2. Based on the status information DS of the second end device, the second end device may be determined by the device manager 232_2 as the danger grade. In this case, an inference request having a higher priority than the inference request IREQ being currently processed may exist, and operation S365 may be performed.

In operation S365, the second inference engine 234_2 may determine whether a requirement of an end device of a higher priority cannot be satisfied, depending on a wait of the inference request IREQ. For example, in the case where a battery fails to supply a power during a waiting time, a requirement of an end device cannot be satisfied. In this case, operation S370 is performed. When a requirement of an end device of a high priority is satisfied, operation S380 is performed.

In operation S370, the second inference engine 234_2 may stop the inference being currently processed. The second inference engine 234_2 may again schedule the inference request IREQ such that the inference request IREQ of a high priority is first of all processed. The stopped inference request IREQ may be again scheduled such that a requirement of a corresponding end device is satisfied.

In operation S380, based on a final scheduling result, inference may be performed on target data corresponding to the end device 210_2. The second inference engine 234_2 may perform inference on target data, based on a machine learning model stored in the server 230_2. Because the second inference engine 234_2 processes the inference request IREQ in consideration of a status of an end device, the second inference engine 234_2 may process the urgent inference request IREQ in real time. As such, the quality of experience (QoE) of the distributed inference system 200_2 may be improved.

In operation S390, the second inference engine 234_2 may provide the inference result IR to the first inference engine 212_2. Also, the second inference engine 234_2 may provide the inference result IR and the target data to the device manager 232_2 for the purpose of creating and training a new machine learning model.

Figure 8:
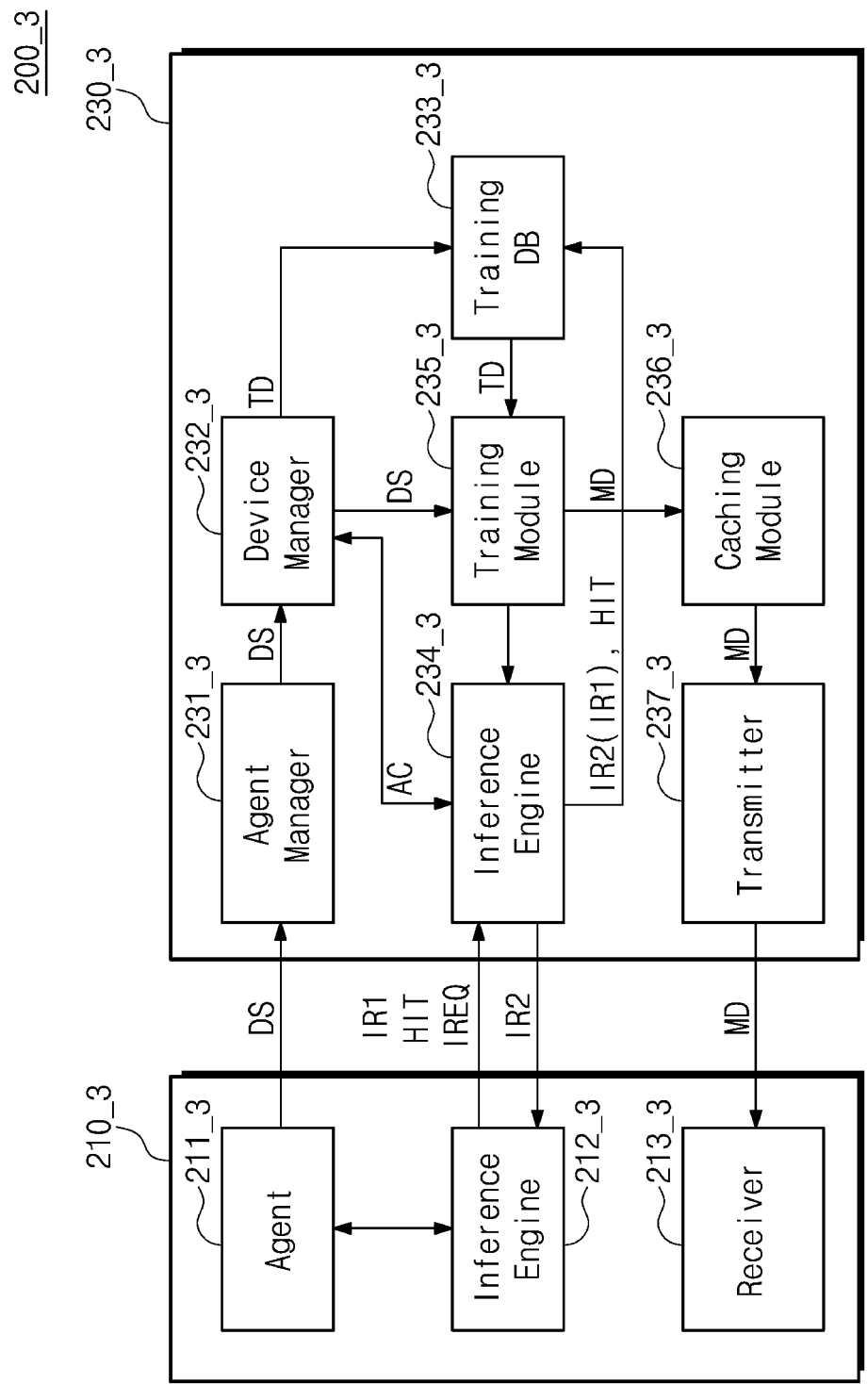
FIG. 8 is a block diagram of a distributed inference system associated with operation S140 of FIG. 3.

FIG. 8 is a block diagram of a distributed inference system associated with operation S140 of FIG. 3. Referring to FIG. 8, a distributed inference system 200_3 may include an end device 210_3 and a server 230_3. The end device 210_3 may include an agent 211_3, a first inference engine 212_3, and a receiver 213_3. The server 230_3 may include an agent manager 231_3, a device manager 232_3, a training database 233_3, a second inference engine 234_3, a training module 235_3, a caching module 236_3, and a transmitter 237_3. FIG. 8 shows a data transfer relationship between some components of FIG. 2 performing operation S140.

The server 230_3 may accumulate the training dataset TD for creating a new machine learning model based on an inference result of the first inference engine 212_3, in the training database 233_3. The server 230_3 may in advance train and create a machine learning model, based on the training dataset TD and the status information DS. Also, the server 230_3 may decide renewal of a machine learning model stored in the end device 210_3 based on the inference result of the first inference engine 212_3. Below, how to train and create a machine learning model in advance and how to renew a machine learning model will be described with reference to FIG. 8.

As described with reference to FIGS. 4 and 6, the agent 211_3 may provide the status information DS to the agent manager 231_3, and the agent manager 231_3 may provide the status information DS to the device manager 232_3. The device manager 232_3 may generate the training dataset TD in consideration of the status information DS. The training dataset TD may be provided to the training database 233_3.

The first inference engine 212_3 may perform inference on target data, based on a machine learning model stored in the end device 210_3. In the case where the inference is successfully performed, the first inference engine 212_3 may provide the target data, a first inference result IR1, and hit data HIT to the second inference engine 234_3. The target data, the first inference result IR1, and the hit data HIT may be provided to the training database 233_3, and the target data, the first inference result IR1, and the hit data HIT may be included in the training dataset TD under control of the device manager 232_3. A hit rate according to the frequency of the hit data HIT or the accuracy AC of the inference result may be included in the training dataset TD. As such, target data that are frequently used may appear in the training dataset TD, and the target data may be selected or weighted upon training a machine learning model.

In the case where the inference of the first inference engine 212_3 fails, the first inference engine 212_3 may provide the target data, the first inference result IR1, and the inference request IREQ to the second inference engine 234_3. The second inference engine 234_3 may generate a second inference result IR2 in response to the inference request IREQ. The second inference result IR2 may be provided to the first inference engine 212_3. Also, the second inference result IR2 and the target data may be provided to the training database 233_3 and may be included in the training dataset TD.

The second inference engine 234_3 may calculate the accuracy AC of the first inference result IR1. The calculated accuracy AC may be provided to the device manager 232_3. In the case where the accuracy AC does not satisfy a reference range corresponding to the end device 210_3, the device manager 232_3 may command the training module 235_3 to create a new machine learning model.

The training module 235_3 may create a new machine learning model MD in response to the command. The training module 235_3 may train and create the machine learning model MD, based on the status information DS and the training dataset TD. As described above, the training module 235_3 may select or weight the target data with reference to a hit rate or etc. included in the training dataset TD.

The training module 235_3 may select a model algorithm appropriate for the end device 210_3, based on the status information DS. For example, based on battery information included in the status information DS, the training module 235_3 may select an algorithm having a process of few operations for reducing energy consumption and may create the machine learning model MD. For example, based on storage space information included in the status information DS, the training module 235_3 may select the training dataset TD of a size corresponding to the storage space or may select a model algorithm corresponding to the storage space. Also, the training module 235_3 may create the machine learning model MD in further consideration of the calculated accuracy AC.

The new machine learning model MD may be renewed at the caching module 236_3. The caching module 236_3 may manage both the new machine learning model MD and a previous machine learning model having the highest accuracy or performance. The new machine learning model MD may be provided to the receiver 213_3 of the end device 210_3 through the transmitter 237_3.

Figure 9:
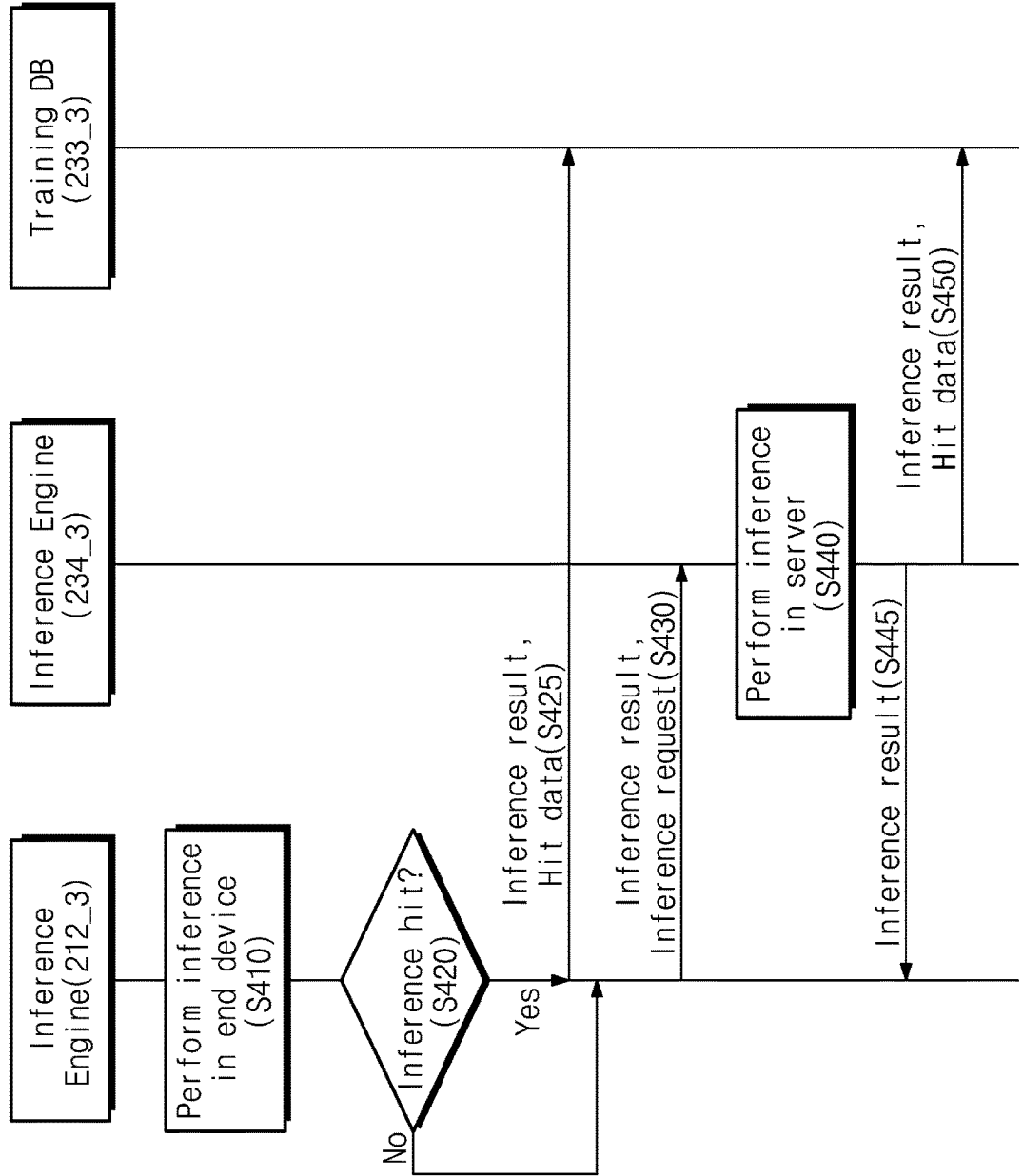
FIGS. 9 and 10 are flowcharts for describing an operating method of a distributed inference system of FIG. 8.

FIG. 9 is a flowchart for describing an operating method of a distributed inference system of FIG. 8. FIG. 9 shows operations of the first inference engine 212_3, the second inference engine 234_3, and the training database 233_3 of FIG. 8. FIG. 9 shows how to collect target data and inference results from end devices for the purpose of creating a new machine learning model. For convenience of description, FIG. 9 will be described with reference to reference numerals/marks of FIG. 8.

In operation S410, the first inference engine 212_3 may perform inference on target data, based on a machine learning model stored in the end device 210_3. In operation S420, the first inference engine 212_3 may determine whether the inference is successfully performed. When the inference is successfully performed (i.e., in the case of an inference hit), operation S425 is performed. In this case, the first inference result IR1, the target data, and the hit data HIT may be provided to the training database 233_3 through the second inference engine 234_3. The information provided to the training database 233_3 may be managed to create a new machine learning model MD. When the inference fails, operation S430 is performed.

In operation S430, the first inference result IR1, the target data, and the inference request IREQ are provided to the second inference engine 234_3. In operation S440, the second inference engine 234_3 performs inference on the target data in response to the inference request IREQ. The second inference engine 234_3 may perform inference on the target data, based on a machine learning model stored in the server 230_3.

In operation S445, the second inference result IR2 according to the inference may be provided to the first inference engine 212_3 for the purpose of a next operation of the end device 210_3. In operation S450, the second inference result IR2, the target data, and the hit data HIT may be provided to the training database 233_3. The information provided to the training database 233_3 may be managed to create the new machine learning model MD. In addition, the second inference engine 234_3 may calculate the accuracy AC of the first inference result IR1. The accuracy AC may be used to determine whether to renew the machine learning model stored in the end device 210_3.

Figure 10:
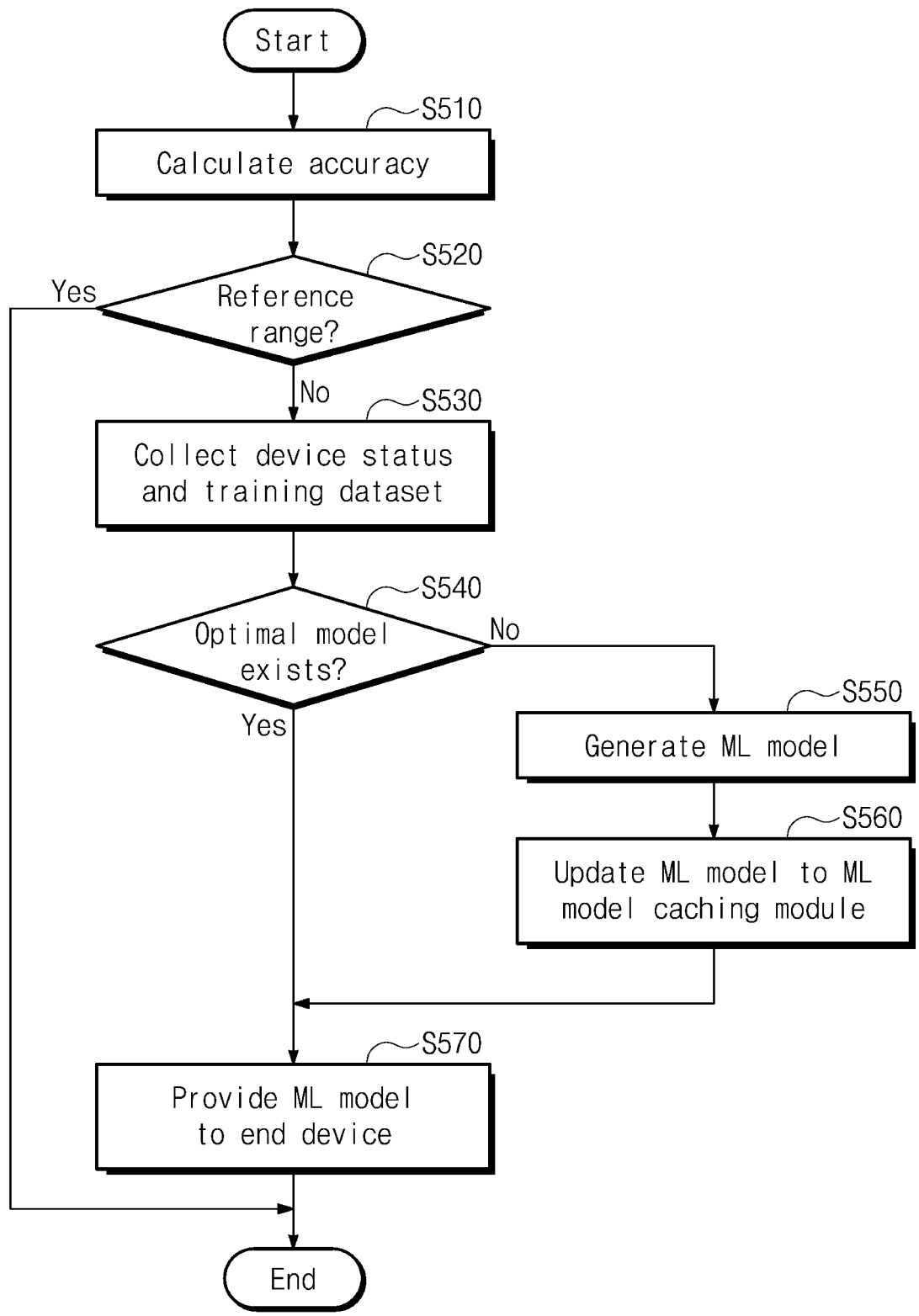

FIG. 10 is a flowchart for describing an operating method of a distributed inference system of FIG. 8. FIG. 10 shows a process of creating a new machine learning model on the basis of target data and an inference result collected in FIG. 9. For convenience of description, FIG. 10 will be described with reference to reference numerals/marks of FIG. 8.

In operation S510, the server 230_3 may calculate the accuracy AC of the first inference result IR1 by the end device 210_3. The accuracy AC of the first inference result IR1 may be calculated at the second inference engine 234_3. For example, the accuracy AC may be calculated based on a result of comparing the first inference result IR1 and the second inference result IR2, but the disclosure is not limited thereto. For example, the accuracy AC may be calculated through the comparison of a preset true value and the first inference result IR1. Alternatively, the accuracy AC may be calculated based on the hit rate of the inference result, that is, the frequency of success. The calculated accuracy AC may be provided to the device manager 232_3.

In operation S520, the server 230_3 may determine whether the calculated accuracy AC satisfies a reference range. The reference range may be a range of the reference accuracy required for a normal operation of the end device 210_3. The determination may be performed by the device manager 232_3. In the case where the reference range is satisfied, because it is unnecessary to change a machine learning model currently stored in the end device 210_3, an operation of renewing the machine learning model may not be performed. When the reference range is not satisfied, operation S530 is performed.

In operation S530, the server 230_3 may collect the status information DS and the training dataset TD. The server 230_3 may receive the status information DS from the end device 210_3. The training module 235_3 may receive the status information DS through the device manager 232_3. Also, the training module 235_3 receives the training dataset TD accumulated in the training database 233_3.

In operation S540, the server 230_3 may determine whether an optimum machine learning model already exists. For example, the training module 235_3 may search the caching module 236_3 for a previously created machine learning model not renewed at the end device 210_3. When the machine learning model exists, operation S570 is performed. When the machine learning model does not exist, operation S550 is performed.

In operation S550, the server 230_3 creates a new machine learning model MD. The training module 235_3 may create the machine learning model MD adaptive to a current status of the end device 210_3, based on the received status information DS and the training dataset TD. In operation S560, the created machine learning model MD may be renewed at the caching module 236_3.

In operation S570, the server 230_3 may provide the machine learning model MD renewed at the caching module 236_3 to the end device 210_3. The renewed machine learning model may be the machine learning model MD created in operation S550 or may be the previously created machine learning model searched in operation S540. The new machine learning model MD may be provided to the receiver 213_3 of the end device 210_3 through the transmitter 237_3.

Figure 11:
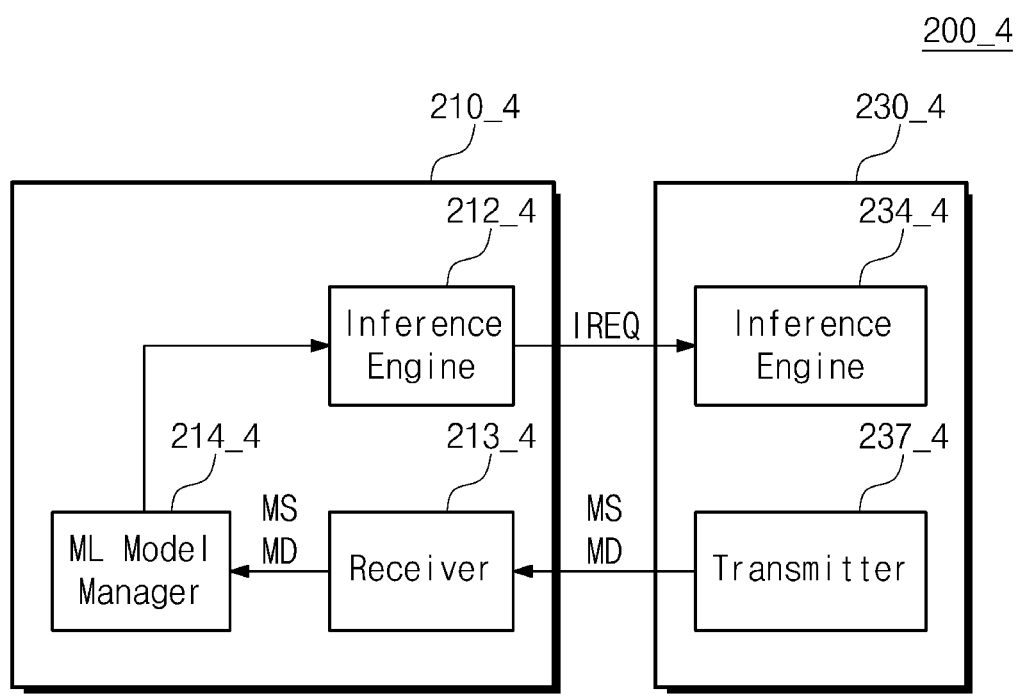
FIG. 11 is a block diagram of a distributed inference system associated with operation S150 of FIG. 3.

FIG. 11 is a block diagram of a distributed inference system associated with operation S150 of FIG. 3. Referring to FIG. 11, a distributed inference system 200_4 may include an end device 210_4 and a server 230_4. The end device 210_4 includes a first inference engine 212_4, a receiver 213_4, and a machine learning model manager 214_4. The server 230_4 includes a second inference engine 234_4 and a transmitter 237_4. FIG. 11 shows a data transfer relationship between some components of FIG. 2 performing operation S150.

As described with reference to FIG. 8, the transmitter 237_4 may provide the machine learning model MD to the receiver 213_4. However, before transmitting the machine learning model MD, the transmitter 237_4 may transmit size information MS of the machine learning model MD to the receiver 213_4. The receiver 213_4 may provide the received size information MS to the machine learning model manager 214_4.

The machine learning model manager 214_4 may compare a current free space of a memory (not illustrated) or storage (not illustrated) of the end device 210_4 with the size information MS. In the case where the size of the machine learning model MD is smaller than the free space, the end device 210_4 may receive the machine learning model MD through the receiver 213_4. Afterwards, the machine learning model manager 214_4 may erase a previous machine learning model.

In the case where the size of the machine learning model MD is greater than the free space, the machine learning model MD fails to be stored in the memory or the storage of the end device 210_4. The machine learning model manager 214_4 may control the first inference engine 212_4 such that all target data that are waiting in the first inference engine 212_4 for the purpose of inference are provided to the second inference engine 234_4 together with the inference request IREQ. Also, the machine learning model manager 214 may erase the previous machine learning model. Afterwards, the end device 210_4 may receive the machine learning model MD through the receiver 213_4. Accordingly, an inference delay due to renewing the machine learning model MD may decrease, and a speed at which data are processed may be improved.

Figure 12:
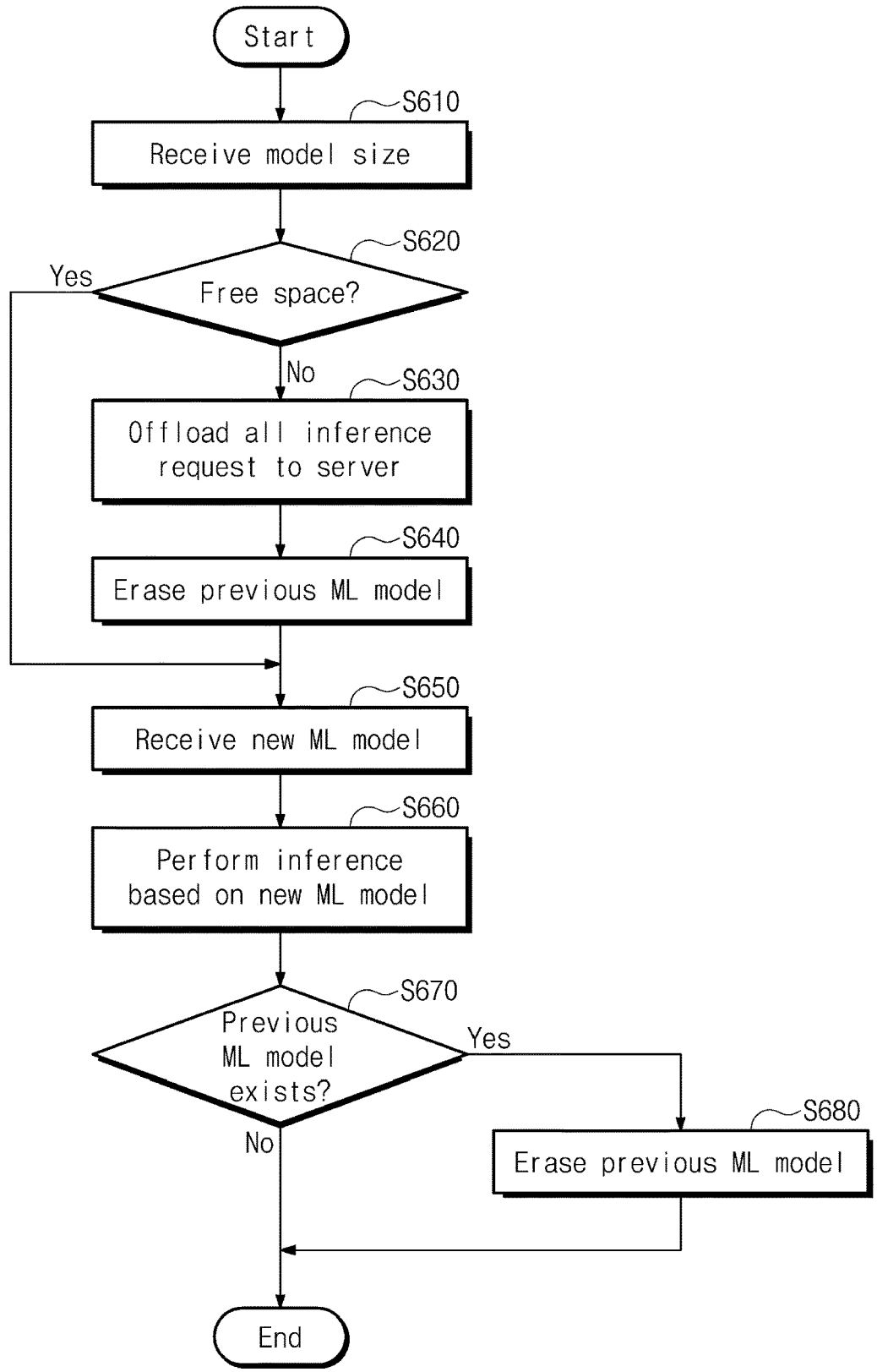
FIG. 12 is a flowchart for describing an operating method of a distributed inference system of FIG. 11.

FIG. 12 is a flowchart for describing an operating method of a distributed inference system of FIG. 11. FIG. 12 shows an operation of renewing a machine learning model depending on a size of a machine learning model created from a server. For convenience of description, FIG. 12 will be described with reference to reference marks/numerals of FIG. 11.

In operation S610, the receiver 213_4 receives the size information MS of the machine learning model MD. The size information MS may be provided to the machine learning model manager 214_4.

In operation S620, the machine learning model manager 214_4 may determine whether a free space of the end device 210_4, which will be used to store the machine learning model MD, is sufficient to store the machine learning model MD. When a sufficient free space is secured, operation S650 is performed, in which the machine learning model MD may be received from the server 230_4. When a sufficient free space is not secured, operation S630 is performed.

In operation S630, the machine learning model manager 214_4 may control the first inference engine 212_4 such that all target data that are waiting in the first inference engine 212_4 for the purpose of inference are offloaded to the second inference engine 234_4 together with the inference request IREQ. That is, a time delay that occurs upon performing the inference after the previous machine learning model is erased and the new machine learning model MD is renewed may decrease.

In operation S640, the machine learning model manager 214_4 may erase the previous machine learning model stored in the end device 210_4. In operation S650, the machine learning model manager 214_4 may allow the receiver 213_4 to receive the new machine learning model MD from the server 230_4. That is, the machine learning model manager 214_4 may decide a time to receive the machine learning model MD, based on the size information MS.

In operation S660, the first inference engine 212_4 performs inference on target data, based on the new machine learning model MD. The machine learning model manager 214_4 may notify the first inference engine 212_4 that the new machine learning model MD is renewed.

In operation S670, the machine learning model manager 214_4 may determine whether a previous machine learning model exists. In the case where the method directly proceeds to operation S650 from operation S620, the previous machine learning model may exist. In this case, the method proceeds to operation S680 in which the previous machine learning model is erased.

Figure 13:
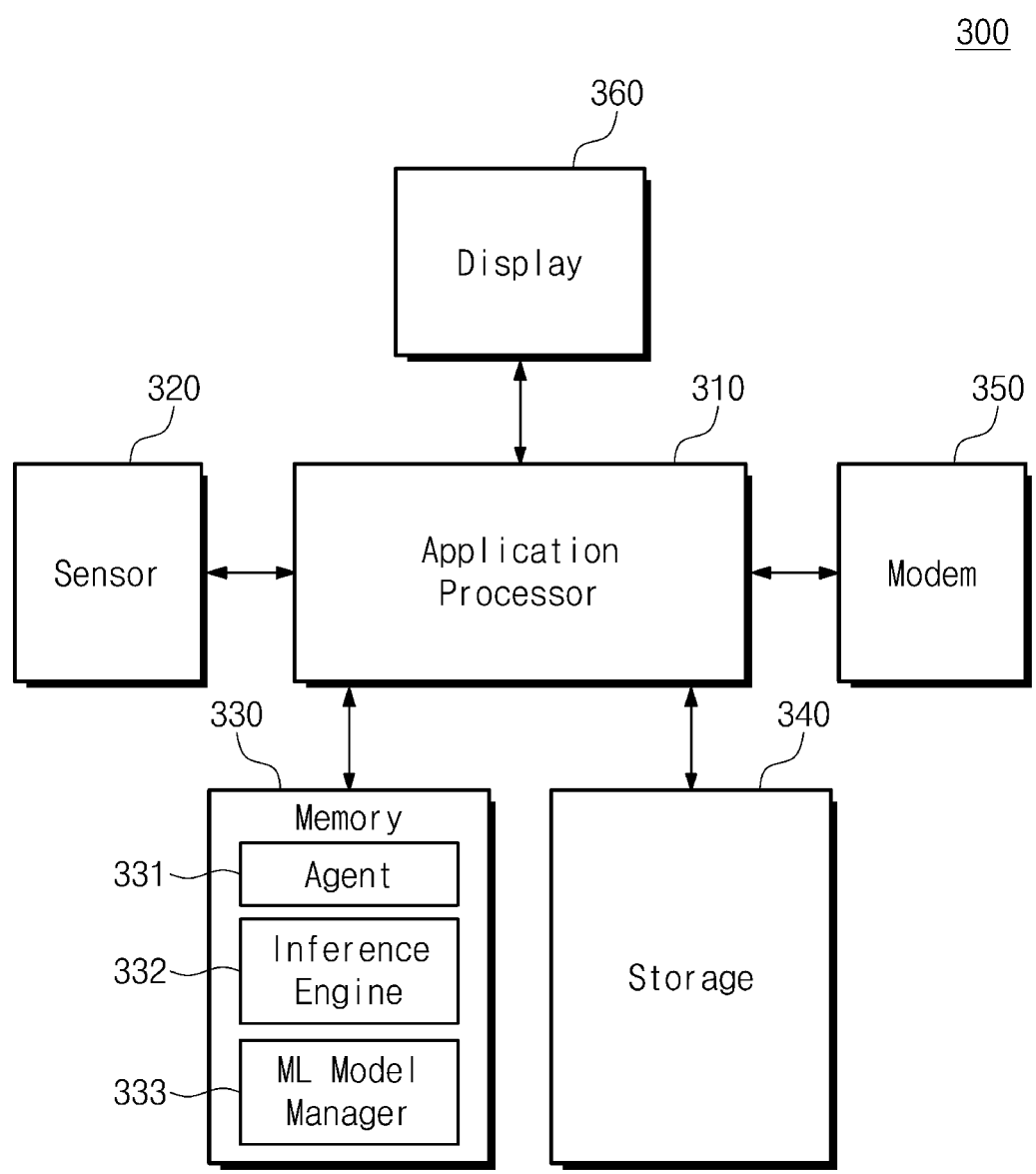
FIG. 13 is a block diagram illustrating an end device of FIG. 1 or 2.

FIG. 13 is a block diagram illustrating an end device of FIG. 1 or 2. In an embodiment, an end device 300 may be an IoT device. Referring to FIG. 13, the end device 300 may include an application processor 310, a sensor 320, a memory 330, storage 340, a modem 350, and a display 360. A configuration of the end device 300 is exemplary, and any other input/output devices or modules may be provided according to a purpose of the end device 300.

The application processor 310 may control overall operations of the end device 300 and operations of components in the end device 300 and may drive an operating system OS. In an embodiment, the application processor 310 may include controllers to control the components in the end device 300, interfaces, graphics engines, etc. The application processor 310 may be implemented with a system-on-chip (SoC).

The application processor 310 may execute an agent 331, an inference engine 332, and a machine learning model manager 333, which are loaded onto the memory 330. The agent 331, the inference engine 332, and the machine learning model manager 334 may correspond to the agent 211, the inference engine 212, and the machine learning model manager 214 of FIG. 2, respectively.

The agent 331 may collect status information as the agent 331 is executed by the application processor 310. The collected status information may be provided to a server through the modem 350. An operating mode of the end device 300 may be changed as the agent 331 is executed. Inference may be performed on target data as the inference engine 332 is executed. An inference result and the target data may be provided to the server through the modem 350. As the machine learning model manager 333 is executed, a time to receive a machine learning model provided from the server may be decided, and the machine learning model may be managed.

Under control of the application processor 310, the sensor 320 may sense information of the outside and may generate the target data. The target data may be input to the inference engine 332. For example, the sensor 320 may include an image sensor to sense an image, a biometric sensor to sense a biometric signal, an illumination sensor, a sound sensor, an acceleration sensor, etc. Also, the sensor 320 may sense an external status of the end device 300, as well as the target data for inference. In this case, the sensor 320 may generate a portion of status information.

The memory 330 may be used as a main memory of the end device 300. For example, various data processed by the processor 310 and processor codes may be loaded onto the memory 330. The memory 330 may include a dynamic random access memory (DRAM), a static RAM (SRAM), a phase-change RAM (PRAM), a magnetic RAM (MRAM), a ferroelectric RAM (FeRAM), a resistive RAM (RRAM), etc.

The storage 340 may be used as an auxiliary memory of the end device 300. For example, source codes of various applications or an operating system executable by the application processor 310 and various data generated by the operating system or applications for long-term storage may be stored in the storage 340. The storage 340 may include a flash memory, a PRAM, an MRAM, a FeRAM, an RRAM, etc.

The modem 350 is configured to perform wired or wireless communication with an external device, for example, a server. The modem 350 may receive a machine learning model, an inference result, manual information, etc. from the server and may transmit target data, the inference result, status information, etc. to the server. The modem 350 may be configured to implement at least one of various standards such as long term evolution (LET), Ethernet, wireless-fidelity (Wi-Fi), and Bluetooth.

The display 360 may display an image, based on an operating mode decided by the agent 331 or an inference result by the inference engine 332. For example, in the case where the inference result indicates that trespassing of an outsider is expected, the display 360 may display an alarm message. The display 360 may include a liquid crystal display (LCD), an organic light-emitting diode (OLED) display, an active matrix OLED (AMOLED) display, a flexible display, an electronic ink, etc.

Figure 14:
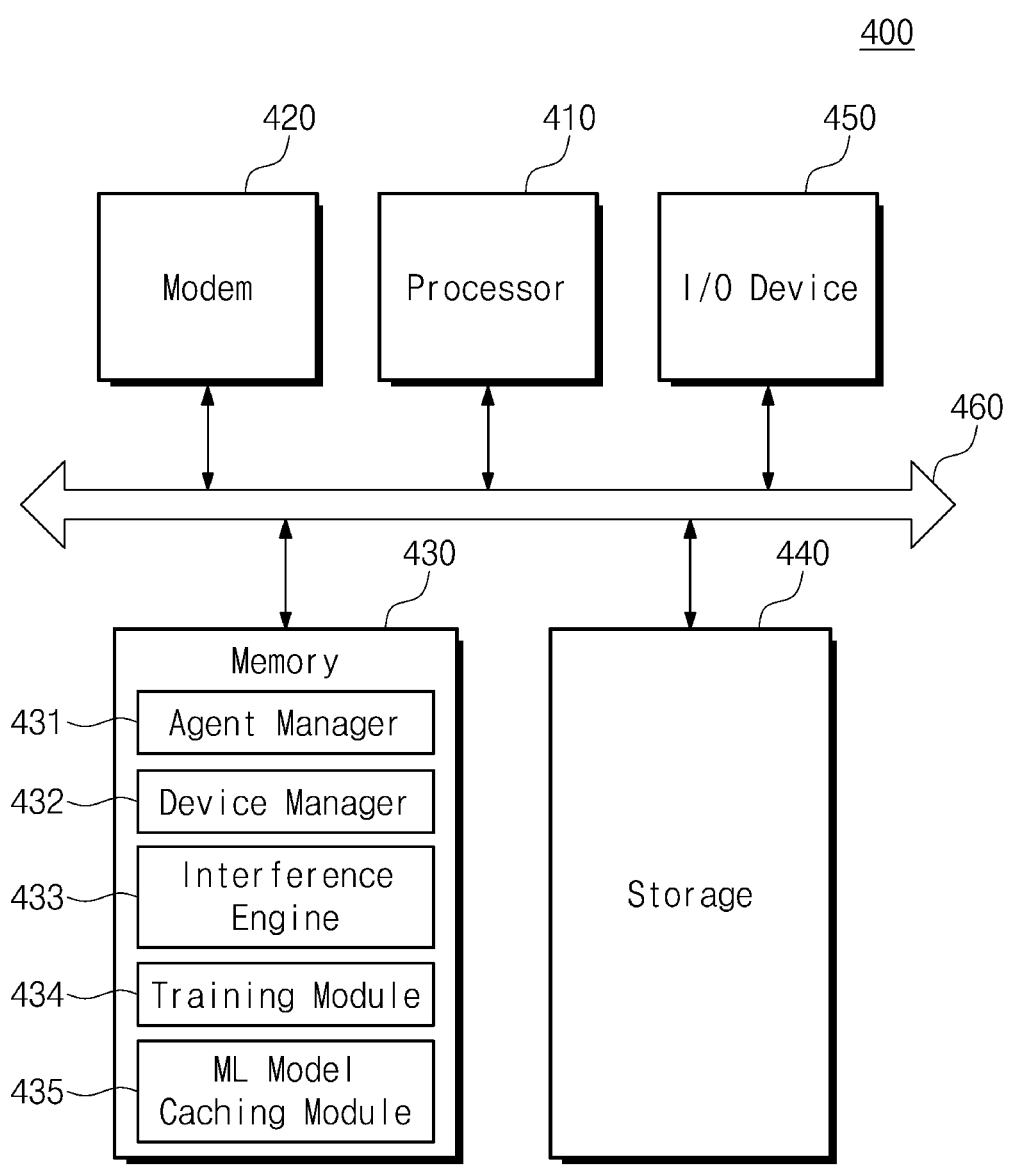
FIG. 14 is a block diagram illustrating a server of FIG. 1 or 2.

FIG. 14 is a block diagram illustrating a server of FIG. 1 or 2. In an embodiment, a server 400 may be a cloud server. Referring to FIG. 14, the server 400 may include a processor 410, a modem 420, a memory 430, storage 440, an input/output device 450, and a bus 460. A configuration of the server 400 is exemplary, and any other devices or modules may be provided according to a purpose of the server 400.

The processor 410 may control overall operations of the server 400 and operations of components in the server 400. The processor 410 may communicate with a plurality of external end devices through the modem 420. The processor 410 may control the server 400 by using the memory 430. The processor 410 may execute an agent manager 431, a device manager 432, an inference engine 433, a training module 434, and a caching module 435 loaded onto the memory 430.

As the agent manager 431 is executed, manual information for controlling an operation of an end device may be generated. As the device manager 432 is executed, a priority between end devices may be decided, and the creation of a new machine learning model may be decided. As the inference engine 433 is executed, inference may be performed on target data, and the accuracy of an inference result may be calculated. As the training module 434 is executed, a machine learning model may be created. The created machine learning model may be renewed at the caching module 435.

The modem 420 is configured to perform wired or wireless communication with an external device, for example, a plurality of end devices. The modem 420 may transmit a machine learning model, an inference result, manual information, etc. to an end device and may receive target data, an inference result, status information, etc. from the end device.

The memory 430 may be used as a main memory of the server 400, and various data processed by the processor 410 and processor codes may be loaded onto the memory 430.

The storage 440 may be used as an auxiliary memory of the server 400, and source codes of various applications or an operating system executable by the processor 410 and various data generated by the operating system or applications for long-term storage may be stored in the storage 440. Also, the training database 223 of FIG. 2 may be implemented in the storage 440.

The I/O device 450 may include input devices such as a touch pad, a keypad, an input button, and a mouse and output devices such as a display and a speaker.

The bus 460 provides a communication path between the components of the server 400. The bus 460 may be configured to support various types of communication formats that are used in the server 400.

According to an embodiment of the disclosure, the performance, stability, and speed of a distributed inference system may be improved by creating a machine learning model in consideration of status information of each of end devices and scheduling a distributed inference request.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:
1. A distributed inference system comprising:
   an end device comprising a processor configured to:
      generate status information corresponding to the end device, obtain target data,
      perform a first inference of the target data based on a first machine learning model and generate an inference result corresponding to the target data,
      when the first inference fails, set a priority of an inference request, and
      transmit the inference request, the status information and the inference result; and
   a server configured to:
      receive the status information and the inference result,
      create a second machine learning model based on the status information and a training dataset comprising the inference result,
      generate accuracy information corresponding to an accuracy of the inference result, and
      transmit the second machine learning model to the end device based on the accuracy information,
   wherein the server comprises:
      a device manager configured to:
         generate a grade of the end device based on the status information, and calculate a priority of the end device based on the grade, and an inference engine configured to perform a second inference of the target data in response to the inference request, wherein the grade comprises one of a first grade associated with a first criteria or a second grade associated with a second criteria, and wherein the inference engine is configured to:
schedule the inference request based on the priority of the end device, and
when the priority of the inference request and the priority of the end device are different, schedule the inference request based on the priority of the inference request.

2. The distributed inference system of claim 1, wherein the server comprises:
an agent manager configured to register the end device based on the status information.

3. The distributed inference system of claim 2, wherein the agent manager is further configured to generate manual information for controlling an operation of the end device based on the grade.

4. The distributed inference system of claim 2, wherein the grade comprises one of the first grade associated with time sensitivity, the second grade associated with accuracy, a third grade associated with efficiency, a fourth grade that is a normal grade, and a fifth grade that is an unimportant grade.

5. The distributed inference system of claim 1, wherein, when a priority of another end device is higher than a priority corresponding to the inference request, the inference engine stops performing the second inference of the target data based on status information of the other end device.

6. The distributed inference system of claim 1, wherein the end device comprises a first inference engine configured to perform the first inference of the target data and generate an inference request or hit data based on the inference result, and
wherein the server comprises a second inference engine configured to perform a second inference of the target data based on the inference request and generate the accuracy information based on the inference result.

7. The distributed inference system of claim 1, wherein the server comprises:
the inference engine configured to:
perform an inference of the target data in response to the inference request from the end device and
calculate the accuracy information based on the inference result;
a device manager configured to generate a command for creating the second machine learning model, based on the accuracy information; and
a training module configured to create the second machine learning model based on the command.

8. The distributed inference system of claim 7, wherein the training dataset further comprises the target data and the accuracy information, and
wherein the training module selects at least a portion of the training dataset based on the accuracy information and creates the second machine learning model based on the selected portion of the training dataset and the status information.

9. The distributed inference system of claim 1, wherein the server is further configured to provide size information of the second machine learning model to the end device, and wherein the end device is further configured to decide a time to receive the second machine learning model based on the size information.

10. The distributed inference system of claim 9, wherein, when a size of the second machine learning model is greater than a free space of the end device, the end device is further configured to receive the second machine learning model after issuing an inference request to the server and erasing the first machine learning model.

11. The distributed inference system of claim 1, wherein the status information includes one of information about a purpose of the end device, information about an internal status of the end device, or information about an ambient status of the end device.

12. An operating method of a distributed inference system, the method comprising:
providing status information corresponding to an end device to a server;
obtaining target data;
performing, at the end device, a first inference of target data based on a first machine learning model and generating an inference result corresponding to the target data;
when the first inference fails, setting a priority of an inference request;
transmitting the inference request, the status information and the inference result to the server;
determining, at the server, whether to create a second machine learning model based on the inference result of the target data;
creating, at the server, the second machine learning model based on the status information and a training dataset comprising the inference result; and
transmitting the second machine learning model to the end device,
wherein the method further comprises:
generating a grade of the end device based on the status information, and
calculating a priority of the end device based on the grade,
wherein the grade comprises one of a first grade associated with a first criteria or a second grade associated with a second criteria, and
wherein the inference request is scheduled based on the priority of the inference request and the priority of the end device.

13. The method of claim 12, wherein the determining whether to create the second machine learning model comprises:
calculating an accuracy of the inference result;
determining whether the accuracy is within a reference range; and
determining whether a previously created machine learning model is present in a caching module of the server.

14. The method of claim 12, wherein the transmitting the second machine learning model comprises:
renewing of the first machine learning model with the second machine learning model by:
providing size information of the second machine learning model to the end device; and
determining a time to receive the second machine learning model based on the size information.

15. The method of claim 14, wherein, when a size of the second machine learning model indicated by the size information is greater than a free space of the end device, the end device receives the second machine learning model after issuing an inference request to the server and erasing the first machine learning model, and wherein, when the size of the second machine learning model is smaller than the free space of the end device, the end device erases the first machine learning model after receiving the second machine learning model.

16. An operating method of a distributed inference system, the method comprising:
providing status information corresponding to an end device to a server;
generating, at the server, a priority corresponding to the end device based on the status information;
performing, at the end device, a first inference of target data obtained by the end device;
setting, by the end device, a priority of a first inference request when the first inference fails based on an inference result of the target data;
providing, by the end device, the first inference request to the server; and
scheduling, at the server, the first inference request based on the priority of the first inference request and the priority corresponding to the end device,
wherein the generating of the priority corresponding to the end device comprises:
assigning a grade corresponding to the end device based on the status information; and
calculating the priority corresponding to the end device based on the grade,
wherein a priority between the end device and another end device is decided based on a grade assigned to each of the end devices based on the status information, and
wherein the grade comprises one of a first grade associated with a first criteria or a second grade associated with a second criteria.

17. The method of claim 16, wherein, when a second end device having the priority issues a second inference request to the server, the second inference request is scheduled based on an order of receiving the first inference request and the second inference request.

18. The method of claim 16, further comprising:
performing, at the server, an inference of the target data in response to the first inference request;
determining whether a priority of a second end device with a second inference request is higher than the priority of the end device; and
when the second inference request with the higher priority exists, stopping the inference of the target data in response to the first inference request based on status information of the second end device.

* * * * *